INVENTOR
TADEUSZ LADYSLAW GAWRONSKI
BY McKenney & McKenney
ATTYS

April 3, 1962     T. L. GAWRONSKI     3,028,174
VEHICLE PNEUMATIC SUSPENSION SYSTEM Filed May 4, 1959     3 Sheets-Sheet 2

INVENTOR
TADEUSZ LADYSLAW GAWRONSKI
BY McKinney & McKinney
ATTYS

United States Patent Office 3,028,174
Patented Apr. 3, 1962

3,028,174
VEHICLE PNEUMATIC SUSPENSION SYSTEM
Tadeusz Ladyslaw Gawronski, Solihull, England, assignor to The Rover Company Limited, Solihull, England
Filed May 4, 1959, Ser. No. 810,698
Claims priority, application Great Britain May 9, 1958
1 Claim. (Cl. 280—124)

The invention relates to the pneumatic suspension of vehicles, and is particularly concerned with the pneumatic suspension of motor vehicles.

It is desirable that a pneumatic suspension system should have the following properties. Firstly, it should be adjustable so that the riding height of the vehicle can be maintained substantially constant irrespective of static load. Secondly, the system should have a low rate about the position to which it has been levelled, and a large increase of load at bump and a small residual load at rebound. This means that the Load/Deflection curve for the system should be S-shaped. This will be described in more detail hereinafter.

Suspension systems are known in which pneumatic springs are connected to a suspension link of the system by a variable length hydraulic strut. Such systems have the disadvantages that there is mechanical friction within the hydraulic struts. In order to obtain the desirable S-shaped curve it is necessary to incorporate rubber blocks to take care of the conditions at bump and rebound.

It is also known to provide pneumatic suspension systems in which the mass of air in an air cell is varied in order to effect load levelling. However, this requires the provision of a heavy and costly air compressor and accumulator and it is difficult to ensure a completely leak-free air system and to exclude dirt and water vapour. Water vapour is liable to condense and sometimes to freeze within the system and also to cause internal corrosion.

An object of the present invention is to provide a pneumatic suspension system having the two aforesaid properties and with which the above disadvantages are at least largely overcome.

According to the present invention a pneumatic suspension system for a vehicle comprises a deformable sealed cell containing pneumatic fluid, the cell being carried either by a supporting or by a suspended part of the vehicle, a pedestal, carried by the other of these two parts and arranged on relative movement between the two parts to deform the cell, thereby to change the volume and the effective load bearing area of the cell, and adjustable means also arranged to deform the cell at a position remote from the pedestal, thereby to change the volume of the cell to effect a change in the level of the suspended part of the vehicle.

The deformable cell may communicate with a deformable surge tank, the cell and the surge tank together forming a sealed unit, the pedestal being arranged to deform at least a wall of the cell and the adjustable means being arranged to deform at least a wall of the surge tank.

The term "pneumatic fluid" has been used herein to include not only air; but also other suitable gases.

By way of example, several embodiments of the invention will now be described with reference to the drawings, in which.

Figure 1:
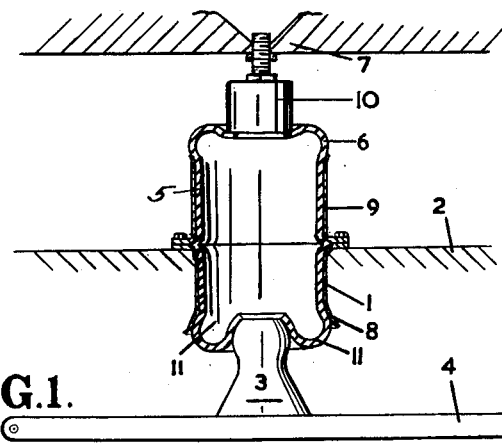
FIGURES 1 to 4 are diagrammatic sectional views of four different embodiments.

The suspension system of the first embodiment, shown in FIGURE 1, comprises a cell 1 in the form of a flexible bag supported peripherally in a rigid collar 8 mounted on a frame member 2 of the vehicle, i.e., on the suspended part of the vehicle. The bottom wall of the cell 1 is attached to a profiled pedestal 3 of generally frusto-conical form, carried on a member 4 of the suspension linkage. The flexible bag forming the cell also forms a surge tank 5 integral with the cell 1. The surge tank portion 5 of the flexible bag is supported peripherally by a rigid collar 9 carried on the member 2. The upper end 6 of the surge tank 5 is deformable by means of an adjustable piston 10 carried on another frame member 7 of a suspended part of the vehicle. The cell 1 and the surge tank 5 together form a sealed unit containing air or other suitable gas. Relative movement between the frame of the vehicle and the linkage member 4 causes the pedestal 3 to be pushed into the cell 1 and so to change the volume of the combined cell and surge tank and hence the internal pressure therein. The region of the cell wall immediately surrounding the pedestal 3 forms a rim 11, which together with the cross-sectional area of the pedestal provides the effective load bearing area. The cell wall is deformed to the form of the pedestal profile, as the pedestal is pushed into the cell and so, in addition to the change of volume of the cell, there is also a change of effective load bearing area. The combined effect of changing the volume, and hence the internal pressure of the cell and surge tank sealed unit, and the change of load bearing area, varies the load exerted by the cell and surge tank through the pedestal 3. The design of the cell and the pedestal profile are such that the relationship between the load and the relative movement i.e., the deflection, follows a particular curve for each initial or static load on the suspension system. This will be discussed hereinafter with reference to FIGURE 6. The piston 10 can be adjusted to deform the upper wall of the surge tank and hence the combined volume of the surge tank and cell. This will affect the load exerted by the combined surge tank and cell unit.

If the static load on the vehicle changes, the suspended part of the vehicle will become either higher or lower than its designed position. A change of static load is compensated for, by adjusting the piston to change the volume of the combined surge tank and cell unit. The piston 10 may be moved into or out of the surge tank electrically, mechanically or by fluid-operated means. The movement may be effected by manual control or automatically.

Figure 2:
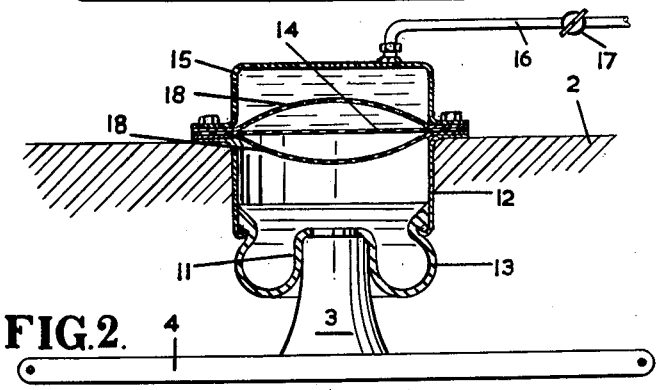

FIGURE 2 shows a second embodiment of the invention in which the cell and surge tank are formed by a rigid canister 12 supported on the vehicle frame 2 and sealed at one end by a single convolution bellows 13, which carries the pedestal 3, and at the other end by a flexible diaphragm 14. Movement of the flexible diaphragm 14 to effect a change in volume of the combined surge tank and cell is effected by the volume of an operating fluid in a tank 15 mounted on the member 2 immediately above the diaphragm 14. The supply of the operating fluid to the tank 15 is controlled through a pipe 16 including a control valve 17. Curved perforated plates 18 mounted above and below the flexible diaphragm 14 limit the extreme movement of the diaphragm and hence limit the range of levelling which can be performed.

Figure 3:
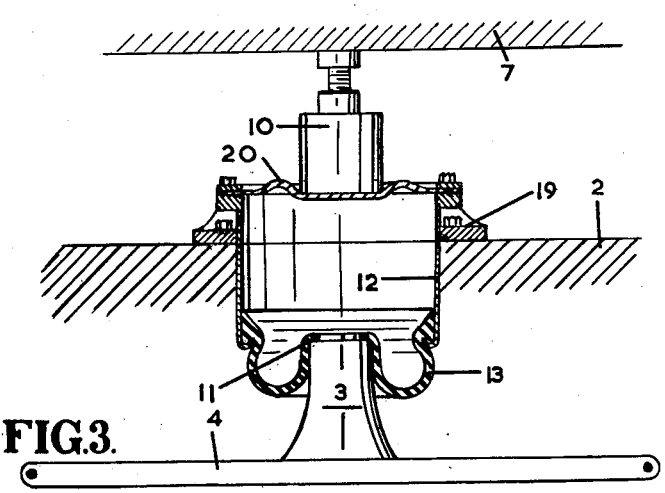

In the third embodiment shown in FIGURE 3 the surge tank comprises a casing 19 which is mounted on the member 2 immediately above the cell and is closed by a flexible diaphragm 20 which is acted upon by the adjustable piston 10.

Figure 4:
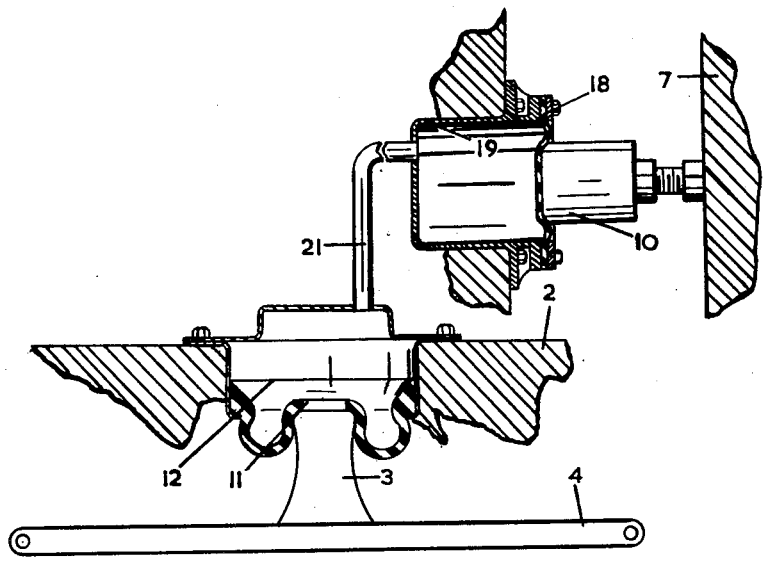

FIGURE 4 illustrates how the adjustable piston 10 and the surge tank 19 can be positioned remotely from the cell 12. The cell and the surge tank are in communication through a pipe or duct 21. The surge tank 19 is supported on a part of the suspended part of vehicle. For convenience this has been shown by reference numeral 2.

Figure 5:
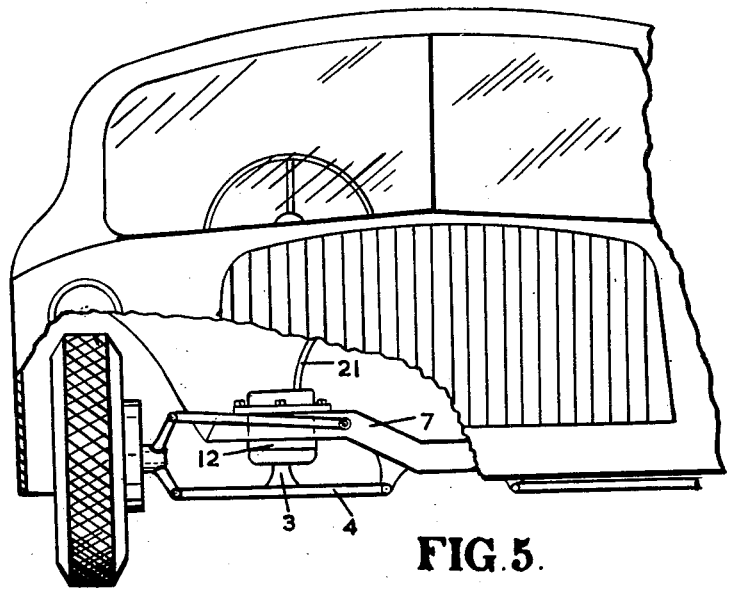
FIGURE 5 is a diagram showing how the embodiment shown in FIGURE 4 can be fitted to a motor car.

FIGURE 5 shows how the combined cell and surge tank shown in FIGURE 4 can be fitted in a motor vehicle. The other embodiments may be fitted in a motor vehicle in a similar manner.

Figure 6:
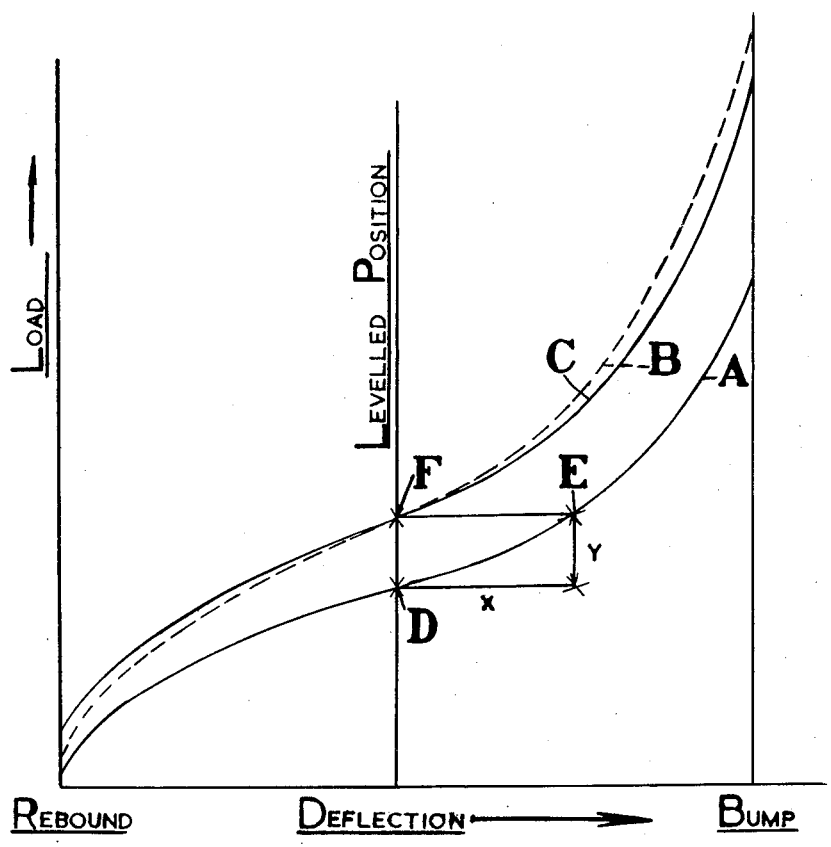
FIGURE 6 shows Load/Deflection characteristics for a suspension system according to the present invention and for a known suspension system between bump and rebound limits.

Referring now to FIGURE 6, the curve A represents the characteristic of the suspension system between bump and rebound for a given static loading. The pneumatic cell has a normal low rate as shown by the gradient of the centre part of the curve A. The profile of the pedestal is so designed that at bump, the characteristic is modified to increase rapidly the load, and at rebound there is a small residual load. The desired curve is of general S-shape as will be seen from FIGURE 6. Point D indicates the level position at the loading for which curve A has been plotted. If the load is now increased by an amount $y$, downward deflection of the system by an amount $x$ will occur in accordance with the curve A. This means that the system will assume the state indicated by point E and will be suspended too low. To bring the suspended part of the vehicle back to its normal designed level, the load effected by the combined cell and surge tank must be increased until the suspended part of the vehicle has been restored to its designed height. The point F is then reached and the suspension system will operate according to the new curve B (shown by broken line). Curve C (full line) shows a typical characteristic of a pneumatic spring, levelled by the known method of introducing air into the cell. It will be seen that the load at bump is lower than it would be with the present invention and that there is a higher residual load at rebound. Thus the present invention gives a better riding effect.

In addition to the easy load levelling facility, the present invention enables the riding height of the suspended part of the vehicle to be altered for occasional cross-country use and also for jacking the vehicle to facilitate wheel changing.

What I claim as my invention and desire to secure by Letters Patent of the United States is:

A pneumatic suspension system for a vehicle having relatively movable supporting and suspended parts interconnected by said system, the system comprising a deformable sealed container, containing a fixed mass of air and forming a combined cell and surge tank, arranged end-to-end in direct communication with each other, said container being carried on one of said supporting and suspended parts of the vehicle; a pedestal, carried by the other of said parts and arranged, on said relative movement between the parts, to deform a first end wall of said container, thereby to change the volume and the effective load bearing area of the container; a flexible diaphragm at the end of said container remote from said first end wall; a chamber communicating with said diaphragm at the side thereof remote from said container; a supply-pipe to said chamber; a control valve in said supply-pipe, said chamber arranged to be supplied with a levelling fluid through said control valve and said supply-pipe to effect deflection of said diaphragm and thereby to effect a change in volume of said container and to effect a change in the level of the suspended part of the vehicle, and a pair of perforated plates, positioned one on each side of said diaphragm and forming stops to limit the range of levelling which can be effected.

References Cited in the file of this patent
UNITED STATES PATENTS

| | | |
|---|---|---|
| 1,039,537 | Hofmann | Sept. 24, 1912 |
| 1,869,285 | Taber | July 26, 1932 |
| 2,115,158 | Dupuy | Apr. 26, 1938 |
| 2,720,274 | Blomquist | Oct. 11, 1955 |
| 2,757,376 | Brueder | July 31, 1956 |
| 2,846,983 | Otto | Aug. 12, 1958 |
| 2,913,254 | Ruhl | Nov. 17, 1959 |

FOREIGN PATENTS

| | | |
|---|---|---|
| 1,152,495 | France | Sept. 2, 1957 |